United States Patent [19]

Corbeil

[11] 4,081,665
[45] Mar. 28, 1978

[54] LIGHTING FIXTURE FOR PASSENGER VEHICLES

[75] Inventor: Paul Corbeil, Laval, Canada

[73] Assignee: Peerless Electric Ltd., Montreal, Canada

[21] Appl. No.: 725,945

[22] Filed: Sep. 23, 1976

[51] Int. Cl.² .................... B60Q 1/00; B06Q 3/00; B60Q 11/00; G09F 13/00
[52] U.S. Cl. ................................ 362/223; 40/558; 40/574; 40/578
[58] Field of Search .................... 240/7.1 C, 7.35; 40/132 R, 12

[56] References Cited

U.S. PATENT DOCUMENTS 3,210,875  10/1965  Schwenkler ............... 40/12 X
3,211,904  10/1965  Schwenkler ............... 40/132 R X Primary Examiner—Richard A. Wintercorn

[57] ABSTRACT

A lighting fixture comprising a housing having a light source therewithin. A light transmitting panel is hinged to the housing with one of the longitudinal edges of the panel being formed with a hinge flange to hingeably engage within a channel member secured to the housing. The other longitudinal edge is provided with fasteners to removably secure the panel to the housing. The panel is constructed of translucent material and seals are provided to prevent light within the housing from leaking along the peripheral edge of the panel whereby all of the light from the housing is directed through the panel.

8 Claims, 5 Drawing Figures

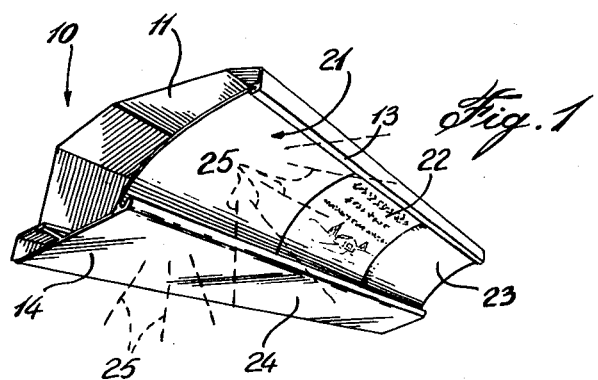
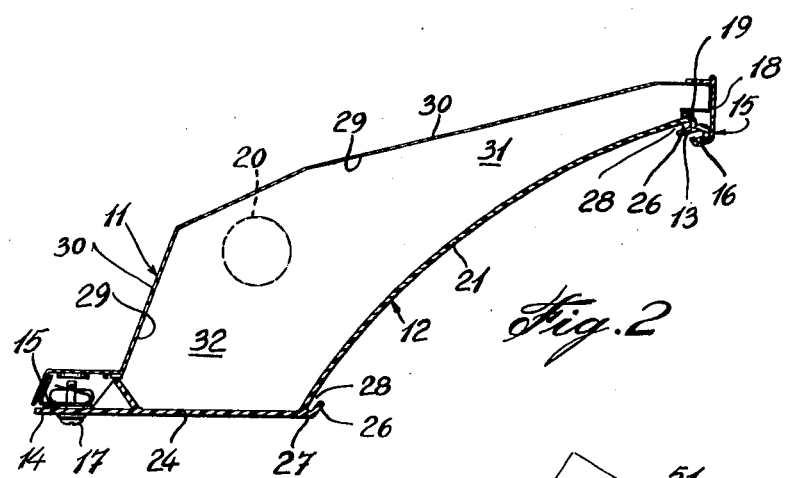
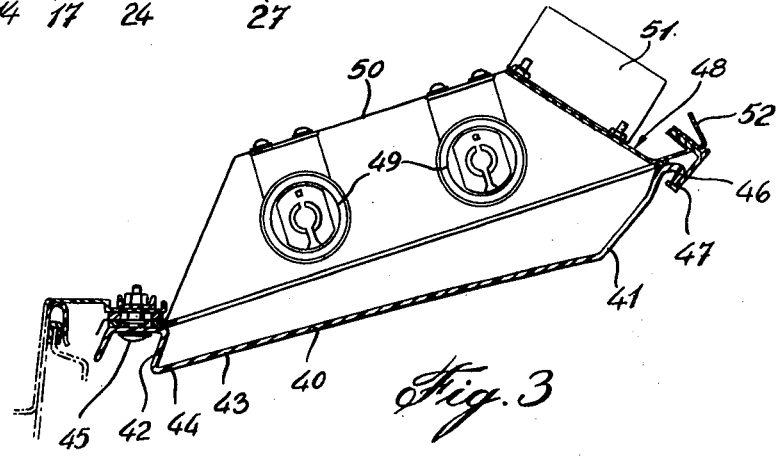

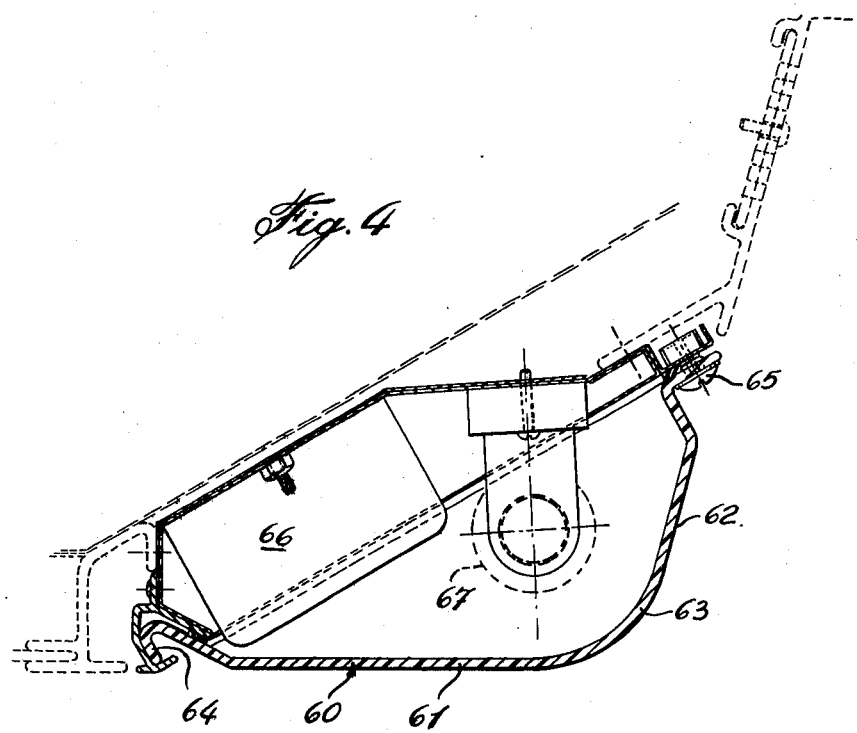
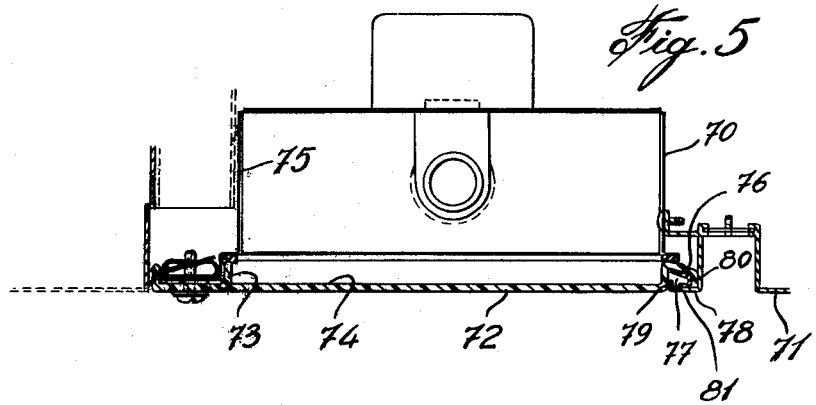

LIGHTING FIXTURE FOR PASSENGER VEHICLES

BACKGROUND OF THE INVENTION (a) Field of the Invention

The present invention relates to lighting fixtures for use in transport vehicles such as trains, subway vehicles, buses, or the like vehicles where lighting is provided from the ceiling or top corners of such passenger vehicles.

(b) Description of Prior Art

Various types light fixtures have been provided for passenger vehicles and for mounting in the ceiling thereof to provide general illumination and/or illumination of display advertisement normally provided in such vehicles. Many of the known types of lighting fixtures for this use, however, are difficult to service and some of them are complex in construction.

SUMMARY OF INVENTION

It is a feature of the present invention to provide an improved lighting fixture for use in passenger vehicles of the type capable of transporting many passengers.

It is a feature of the present invention to provide a lighting fixture which is simple in construction and which is easily serviceable without the necessity of removing the fixture from the vehicle for repair.

A still further feature of the present invention is to provide a lighting fixture which can provide general illumination and/or display advertising illumination.

According to the above features, the present invention provides a lighting fixture comprising a housing having a light source therewithin. A light transmitting panel is hinged to the housing with one of the longitudinal edges of the panel being formed with a hinge flange to hingeably engage within a channel member secured to the housing. The other longitudinal edge is provided with fasteners to removably secure the panel to the housing. The panel is constructed of translucent material and seals are provided to prevent light within the housing from leaking along the peripheral edge of the panel whereby all of the light from the housing is directed through the panel.

Additionally, in the present invention, the light transmitting panel is hinged directly to the housing by the hinge flange which is integrally formed with the panel to engage a channel member formed in an upper peripheral edge of the housing. The hinge flange is constituted by a marginal edge portion of the one longitudinal edge being inwardly turned in the direction of an outer surface of the panel to form a hook flange. The panel also defines a display section for general illumination and for back lighting sheet-like display material held against an outer surface of the display section. A lower section is provided in the panel for general illumination. Both lens sections have flat inner and outer surfaces and do not require prisms formed therein to provide concentration of light in a particular area. These prisms are very difficult to clean once dust enters the light fixture and the accumulated dirt affects the light transmission properties of the panel.

A preferred embodiment of the present invention will now be described with reference to the example as illustrated in the accompanying drawings in which:

FIG. 1 is a perspective view showing a lighting fixture constructed in accordance with the present invention and providing general illumination and display advertising illumination;

FIG. 2 is a cross sectional view of the lighting fixture as shown in FIG. 1;

FIG. 3 is a cross sectional view of a further example of the lighting fixture constructed in accordance with the present invention;

FIG. 4 is a cross sectional view of a still further example of the lighting fixture constructed in accordance with the present invention; and FIG. 5 is a cross sectional view of a still further example of a lighting fixture constructed in accordance with the present invention.

DESCRIPTION OF PREFERRED EMBODIMENTS

Referring now to the drawings and more particularly to FIGS. 1 and 2 there is shown generally at 10 the lighting fixture of the present invention. The fixture comprises a housing 11 to which is secured a light transmitting panel 12. The light transmitting panel 12 has opposed longitudinal edges 13 and 14 with the longitudinal edge 13 being provided with a hinge flange 15 formed by an inwardly turned marginal edge portion of the panel whereby to form a hook flange 16. Thus, there is provided a one piece lock-hinge diffuser or panel 12.

Fasteners 17, of the screw lock type, are provided along the other longitudinal edge 14 to secure the panel 12 to the housing 11, in a manner well known in the art. Normally, two such fasteners 17 are provided, one at each end of the panel to secure it in place whereby the panel is held in position by the hinge flange 15 held in a channel member 18 and the lock screw 17 secured to the housing 11.

Seals 19 are provided about the periphery of the panel 12 to prevent light within the housing from leaking along the peripheral edge of the panel whereby substantially all the light provided by the light source, hereinshown as a fluorescent tube 20, is directed through the light transmitting panel 12.

The light transmitting panel 12 defines a display section 21 for general illumination and for back lighting sheet-like display material 22 held against the outer surface 23 of the display section 21. A lower section 24 provides general illumination of the vehicle and is normally positioned above or to the side of seats (not shown) normally provided in such vehicles for the passengers. Both of the lens sections 21 and 24 as herein shown have flat inner and outer surfaces whereby the light transmission is unidirectional as illustrated by the lines 25 representing light rays.

As can be seen the display section 21 is inwardly curved in transverse cross-section. An open end elongated channel 26 is disposed along each longitudinal edge 15 and 27 on the display section. The open end 28 of each channel 26 faces one another whereby to retain the display material 22 therebetween. The inwardly curved surface causes the sheet-like display material 22 to arc in a specific direction towards the outer surface 23 to provide pressure between opposed ends of the display material by the channels whereby to maintain the display material in tight fit against the outer surface 23.

Referring now to FIG. 2, the light housing is provided with a light reflective inner surface 29 on the back wall 30 of the housing. The back wall 30 is formed of angulated sections which gives it an arcuate shape and whereby it defines a narrow tapering chamber 31 behind the panel display section 21 of the panel and a larger component chamber 32 adjacent the panel lower section 24. The fluorescent lamp 20 is secured in an area substantially between the chambers 31 and 32 whereby to provide proper illumination of both sections 21 and 24 of the light transmitting panel.

The light display panel hereinshown is constructed of translucent plastics material of white opal shade. Also as hereinshown the hinge 15 of the panel is provided at the upper-most part thereof and it is within the ambit of the present invention to interchange the location of hinge 15 with the location of the locking fasteners 17 whereby the panel hinges from the lower-most marginal edge thereof.

Referring now to FIG. 3 there is shown another example of a lighting fixture and herein the light transmitting panel 40 is formed of a large rectangular flat section to provide most of the illumination. A short inwardly sloping upper marginal section 41 provides illumination in a substantially horizontal direction upwardly of the large rectangular flat section. A second short section 42 is formed below the rectangular section and is disposed parallel to the first section 41. The second section 42 extends inwardly of the outer surface 43 of the panel and at an angle disposed between the planar axis of the rectangular section, as shown by numeral 40, and a transverse axis to the planar axis. Thus, there is formed a protruding edge in the area 44 of the panel 40 which conceals part of the locking screws 45 provided in the lower marginal edge portion of the panel. The hinge flange 46 is constituted by an inwardly turned marginal edge portion of the panel whereby to form a hook flange which is secureable within the L-shaped bracket 47 secured to a lower marginal edge portion of the light housing 48. As shown, there are two fluorescent lamps 49 secured within the housing 48 and an automatic ballast 51 is secured to the back surface of the back wall 50. The panel 40 is also constructed of a plastic material such as polycarbonate or acrylic plastic.

As shown in this embodiment, the housing 48 is secured to a hinge 52 which is secured to a frame work provided on the vehicle whereby the entire lighting fixture can be hinged out of the vehicle frame work to service the ballast which is mounted on the back wall.

Referring now to FIG. 4, there is shown a further type of lighting fixture construction and herein the light transmitting panel 60 defines a horizontal light transmitting section 61 and a substantially transverse front section 62 formed integral with the horizontal section 60 and interconnected thereto by an arcuate section 63. This type of lamp transmitting panel provides illumination through an arc of at least 90° and is usually located in the area between the vertical walls and the ceiling of the vehicle. As hereinshown, the hinge flange is constituted by a hook flange 64 formed along the lower marginal edge of the panel 61. The other longitudinal marginal edge is provided with the lock fastener 65 whereby the panel 60 will hinge downwardly to expose the ballast 66 and fluorescent tube 67 for servicing.

Referring now to FIG. 5 there is shown a still further lighting fixture construction 70 which is mounted within the ceiling 71 whereby the light transmitting panel 72 is flush with the ceiling 71. As hereinshown, the light transmitting panel 72 is a flat plate-like panel. A longitudinal rib 73 extends from a rear surface 74 of the panel 72 for sealing engagement with the housing 75 and also permits the proper spacing between the housing 75 to permit panel 72 to lie horizontally and flush with the outer surface of the ceiling 71. The hinge flange 76 is constituted by a marginal edge portion of one of the longitudinal edges of the panel 72 being inwardly turned to define an open end channel 77 with the open end 77 lying in the same plane as the flat plate-like panel. The hinge flange 76 is engaged in an L-shaped bracket 78 which has a small inwardly turned free edge 79 which faces into the open end 77 of the channel whereby an outer surface of the plate-like panel is aligned with the ceiling outer surface. As hereinshown, the inner surface of the hinge flange 76 within the open channel 77 is fitted with a metal lining or bracket 80 to reduce wear of the panel 72 in this area and to provide better engagement with the bracket 78. As hereinshown, the lining 80 has an inwardly turned free end 81 whereby to define a clamp 80 of substantially U-shaped configuration and to engage with the inwardly turned free end 79 of the L-shaped bracket 78.

It is within the ambit of the present invention to provide any further modifications of the lighting fixture, provided these modifications fall within the ambit of the claims as herein appended.

I claim:

1. A lighting fixture comprising a housing, a light source within said housing, a light transmitting panel hinged directly to said housing, said panel having opposed longitudinal edges, one of said edges being integrally formed with a hinge flange to hingeably engage within a channel member formed in an upper peripheral edge of said housing, said hinge flange being constituted by a marginal edge portion of said one longitudinal edge being inwardly turned in the direction of an outer surface of said panel to form a hook flange, the other of said edges having fasteners directly attached thereto to removably secure said panel to said housing, said panel being constructed of translucent material and defining a display section for general illumination and for back lighting sheet-like display material held against an outer surface of said display section, and a lower section for general illumination, both said lens sections having flat inner and outer surfaces, and seal means in direct contact with said panel to prevent light within said housing from leaking along the peripheral edges of said panel whereby all of the light from the housing is directed through the panel.

2. A lighting fixture as claimed in claim 1 wherein said display section is inwardly curved in transverse cross-section, an open end elongated channel disposed adjacent each longitudinal edge of said display section, said open end of each channel facing one another whereby to retain said display material therebetween, said inwardly curved surface causing said sheet-like display material to arc in a specific direction toward said outer surface to provide pressure between opposed ends of said display material by said channels to maintain said display material in tight fit against said outer surface.

3. A lighting fixture as claimed in claim 2 wherein said housing has a light reflective inner surface on a back wall thereof, said back wall being arcuately shaped to define a narrow tapering chamber behind said panel display section, a larger component chamber adjacent said panel lower section, and a fluorescent lamp secured in an area substantially between said chambers.

4. A lighting fixture as claimed in claim 2 wherein said hinge flange is constituted by a marginal edge portion of said one longitudinal edge being inwardly turned in a direction of said outer surface of said panel to form a hook flange.

5. A lighting fixture as claimed in claim 4 wherein said hook flange is formed above said channel disposed adjacent a top one of said longitudinal edges of said display section.

6. A lighting fixture as claimed in claim 1 wherein said light transmitting panel is formed by a large rectangular flat section, a first short inwardly sloping upper marginal section formed above said rectangular section, a second short section formed below said rectangular section and parallel to said first section, said second section extending inwardly of an outer surface of said rectangular section and at an angle disposed between the planar axis of said rectangular section and a transverse axis to said planar axis, said hinge flange being constituted by a marginal edge portion of said one longitudinal edge being inwardly turned in the direction of an outer surface of said panel to form a hook flange.

7. A lighting fixture as claimed in claim 1 wherein said lighting transmitting panel defines a horizontal light transmitting section and a substantially transverse front section formed integral therewith and interconnected by an arcuate section, said hinge flange being constituted by a marginal edge portion of said lower one of said longitudinal edges being inwardly turned in the direction of an outer surface of said panel to form a hook flange, said hook flange engaging behind an inwardly extending flange in a generally U-shaped channel of said housing.

8. A lighting fixture as claimed in claim 1 wherein said light transmitting panel is a flat plate-like panel, a longitudinal rib adjacent one of said longitudinal edges and extending from a rear surface thereof for sealing engagement with said housing and to permit a flush support of said panel by said housing, said hinge flange being constituted by a marginal edge portion of one of said longitudinal edges being inwardly turned to define an open end channel having an opening lying in the same plane as said flat plate-like panel engageable in an L-shaped bracket having a small inwardly turned free edge facing into said open end of said channel whereby an outer surface of said plate-like panel is aligned with a ceiling outer surface.

* * * * *